(12) United States Patent
Yamada et al.

(10) Patent No.: US 9,701,857 B2
(45) Date of Patent: Jul. 11, 2017

(54) ACTIVE ENERGY RAY-CURABLE COMPOSITION, AND INK COMPOSITION FOR INKJET RECORDING USE WHICH IS PREPARED USING SAID COMPOSITION

(71) Applicant: DIC Corporation, Tokyo (JP)

(72) Inventors: Tomokazu Yamada, Kita-adachi-gun (JP); Yoichi Tanimoto, Kita-adachi-gun (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

(21) Appl. No.: 14/893,169

(22) PCT Filed: May 27, 2014

(86) PCT No.: PCT/JP2014/063936
§ 371 (c)(1),
(2) Date: Nov. 23, 2015

(87) PCT Pub. No.: WO2014/192729
PCT Pub. Date: Dec. 4, 2014

(65) Prior Publication Data
US 2016/0108264 A1  Apr. 21, 2016

(30) Foreign Application Priority Data
May 27, 2013  (JP) .................................. 2013-110863

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/30* | (2014.01) | |
| *C08F 218/06* | (2006.01) | |
| *C08F 222/10* | (2006.01) | |
| *C09D 11/101* | (2014.01) | |
| *C09D 11/322* | (2014.01) | |
| *C09D 11/107* | (2014.01) | |
| *C09D 133/14* | (2006.01) | |

(52) U.S. Cl.
CPC ............ *C09D 11/30* (2013.01); *C08F 218/06* (2013.01); *C08F 222/1006* (2013.01); *C09D 11/101* (2013.01); *C09D 11/107* (2013.01); *C09D 11/322* (2013.01); *C09D 133/14* (2013.01)

(58) Field of Classification Search
CPC ..... C09D 11/30; C09D 11/101; C09D 11/107; C09D 133/14
USPC ............ 522/26, 7, 6, 71, 189, 184, 1; 520/1
See application file for complete search history.

(56) References Cited

U.S. PATENT DOCUMENTS

| | | | |
|---|---|---|---|
| 2008/0166495 A1 | 7/2008 | Maeno et al. | |
| 2012/0274717 A1* | 11/2012 | Nakano ................. | C09D 11/101 347/102 |
| 2014/0055539 A1* | 2/2014 | Hayata ................. | B41M 5/0047 347/100 |
| 2014/0275319 A1* | 9/2014 | Yamada ............... | C09D 11/101 522/99 |
| 2015/0191627 A1* | 7/2015 | Illsley .................. | C09D 177/00 428/203 |

FOREIGN PATENT DOCUMENTS

| | | |
|---|---|---|
| JP | 2005-179511 A | 7/2005 |
| JP | 2008-179136 A | 8/2008 |
| JP | 2008-189758 A | 8/2008 |

(Continued)

OTHER PUBLICATIONS

Crivello et al, Photoinitiators for Free Radical Cationic and Anionic Photopolymerization, Jun. 8, 1999, Wiley and Sons, 2nd Edition, vol. III, 275-298.*

(Continued)

*Primary Examiner* — Jessica E Whiteley
(74) *Attorney, Agent, or Firm* — Westerman, Hattori, Daniels & Adrian, LLP

(57) ABSTRACT

There are provided an active energy ray-curable composition containing a polymerizable compound represented by General Formula (1), a polymerizable compound represented by General Formula (2), and a photopolymerization initiator, and an ink composition for inkjet recording use.

$$CH_2=CR_1—CO—O—R_2—O—CH=CH—R_3 \quad (1)$$

(In Formula (1), $R_1$ represents a hydrogen atom or a methyl group, $R_2$ represents an organic residue having 2 to 20 carbon atoms, and $R_3$ represents a hydrogen atom or an organic residue having 1 to 11 carbon atoms.)

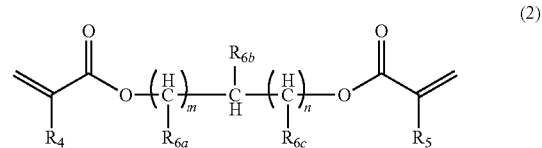

(In Formula (2), each of $R_4$ and $R_5$ independently represents a hydrogen atom or a methyl group, each of $R_{6a}$, $R_{6b}$, and $R_{6c}$ independently represents a hydrogen atom, an alkyl group having 1 to 4 carbon atoms, or an alkoxy group having 1 to 4 carbon atoms, and m+n represents an integer of 0 to 4.).

5 Claims, No Drawings

(56) References Cited

FOREIGN PATENT DOCUMENTS

| | | | |
|---|---|---|---|
| JP | 2011-173952 A | | 9/2011 |
| JP | 2012-162021 A | | 8/2012 |
| JP | 2012-177072 A | | 9/2012 |
| JP | 2012-180391 A | | 9/2012 |
| JP | 2012-193275 A | | 10/2012 |
| JP | 2012-236966 A | | 12/2012 |
| JP | 2013-013673 A | | 1/2013 |
| JP | 2013-18854 A | | 1/2013 |
| JP | 2013-23630 A | | 2/2013 |
| JP | 2013-047305 A | | 3/2013 |
| JP | 2013-47305 A | | 3/2013 |
| JP | 2013-136737 A | | 7/2013 |
| JP | 2014-65862 A | | 4/2014 |
| WO | 2011/027162 A1 | | 3/2011 |
| WO | 2013-062090 | * | 5/2013 |
| WO | 2014-035880 | * | 3/2014 |
| WO | 2014-165323 | * | 3/2014 |

OTHER PUBLICATIONS

International Search Report dated Jun. 24, 2014, issued in counterpart application No. PCT/JP2014/063936 (2 pages).

* cited by examiner

ACTIVE ENERGY RAY-CURABLE COMPOSITION, AND INK COMPOSITION FOR INKJET RECORDING USE WHICH IS PREPARED USING SAID COMPOSITION

TECHNICAL FIELD

The present invention relates to an active energy ray-curable composition, and an ink composition for inkjet recording use which is prepared using the composition.

BACKGROUND ART

In recent years, various methods have been used as a recording method for forming an image based on image data signals on a recording medium such as paper. Among these, an inkjet recording system is an inexpensive apparatus, and since an ink is discharged onto only the necessary image portion to directly form an image on a recording medium, in the inkjet recording system, it is possible to efficiently use the ink, and running cost is low. Furthermore, the inkjet system makes little noise, and therefore, is excellent as an image recording method.

In recent years, in the recording method of the inkjet system, a photocurable ink composition cured by light irradiation has been used as an ink composition which can give good water resistance, solvent resistance, and abrasion resistance.

For example, PTL 1 discloses a photocurable ink composition which includes 2-(vinyloxyethoxy)ethyl acrylate, dipropylene glycol di(meth)acrylate, and a monofunctional (meth)acrylate having an aromatic ring skeleton, and further includes a coloring material, as a polymerizable compound.

For example, PTL 2 discloses a photocurable ink composition obtained by combining 2-(vinyloxyethoxy)ethyl acrylate and at least any one of 1,9-nonanediol diacrylate and 1,10-decanediol diacrylate, as a polymerizable compound.

For example, PTL 3 discloses an active energy ray-curable type inkjet ink composition containing a diacrylate monomer having a linear or branched structure having 10 carbon chains, as a polymerizable compound, and as a specific example, an example in which 2-(vinyloxyethoxy) ethyl acrylate and the diacrylate monomer are used in combination is disclosed.

For example, PTL 4 discloses an ink liquid formed of 2-(vinyloxyethoxy)ethyl acrylate and isobonyl acrylate or 1,6-hexanediol diacrylate, a polymerization initiator, a pigment dispersion, and a surfactant.

For example, PTLs 5, 6, 7, and 8 disclose an ink composition obtained by combining 3-methyl pentanediol diacrylate of a difunctional acrylate monomer and a monofunctional acrylate monomer having N-vinyl caprolactam and a cyclic substituent, as a polymerizable compound.

However, the compositions, inks, or liquids disclosed in PTLs 1 to 8 need to be improved in curing properties and odor generated from the coated film surface after curing.

CITATION LIST

Patent Literature

[PTL 1] JP-A-2012-236966
[PTL 2] JP-A-2013-018854
[PTL 3] JP-A-2012-193275
[PTL 4] JP-A-2008-179136
[PTL 5] WO 2011/027162
[PTL 6] JP-A-2012-162021
[PTL 7] JP-A-2012-177072
[PTL 8] JP-A-2012-180391

SUMMARY OF INVENTION

Technical Problem

An object of the present invention is to provide an active energy ray-curable composition which can be applied to an active energy ray-curable type inkjet ink of which the curing properties are good regardless of the film thickness and the printing ratio of a printed matter and in which the odor generated from the coating film is significantly low.

Solution to Problem

The present inventors achieved the object by combining a polymerizable compound having a (meth)acryloyl group and a vinyl ether group as a phtopolymerizable compound and a diacrylate compound having a specific structure.

That is, the present invention provides an active energy ray-curable composition containing the polymerizable compound represented by General Formula (1), the polymerizable compound represented by General Formula (2), and a photopolymerization initiator.

[Chem. 1]

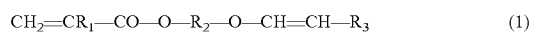

(In Formula (1), $R_1$ represents a hydrogen atom or a methyl group, $R_2$ represents an organic residue having 2 to 20 carbon atoms, and $R_3$ represents a hydrogen atom or an organic residue having 1 to 11 carbon atoms.)

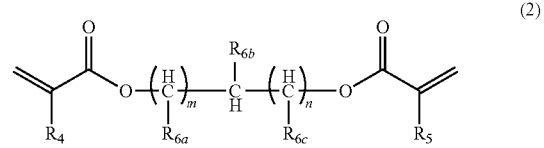

(In Formula (2), each of $R_4$ and $R_5$ independently represents a hydrogen atom or a methyl group, each of $R_{6a}$, $R_{6b}$, and $R_{6c}$ independently represents a hydrogen atom, an alkyl group having 1 to 4 carbon atoms, or an alkoxy group having 1 to 4 carbon atoms, and m+n represents an integer of 0 to 4.)

In addition, the present invention provides a cured product formed by curing the active energy ray-curable composition described above.

In addition, the present invention provides an ink composition for inkjet recording use which uses the active energy ray-curable composition.

Advantageous Effects of Invention

By using the active energy ray-curable composition of the present invention, an active energy ray-curable type inkjet ink composition of which the curing properties are good regardless of the film thickness and the printing ratio of a printed matter and in which the odor generated from the coating film is significantly low can be provided.

DESCRIPTION OF EMBODIMENTS

In an active energy ray-curable composition of the present invention, the polymerizable compounds represented by General Formulas (1) and (2) are used as essential components.

(Polymerizable Compound Represented by General Formula (1))

In General Formula (1), $R_1$ represents a hydrogen atom or a methyl group, $R_2$ represents an organic residue having 2 to 20 carbon atoms, and $R_3$ represents a hydrogen atom or an organic residue having 1 to 11 carbon atoms.

Specifically, $R_2$ represents a linear, branched, or cyclic alkylene group having 2 to 20 carbon atoms, an alkylene group having 2 to 20 carbon atoms which has an oxygen atom by an ether bonding and/or an ester bonding in the structure thereof, or an aromatic group having 6 to 11 carbon atoms which may be substituted. Among these, an alkylene group having 2 to 6 carbon atoms or an alkylene group having 2 to 9 carbon atoms which has an oxygen atom by an ether bonding in the structure thereof is preferable.

In addition, specific examples of an organic residue having 1 to 11 carbon atoms represented by $R_3$ include a linear, branched, or cyclic alkyl group having 1 to 10 carbon atoms and an aromatic group having 6 to 11 carbon atoms which may be substituted. Among these, an alkyl group having 1 or 2 carbon atoms or an aromatic group having 6 to 8 carbon atoms is preferable.

Among these, 2-(2-vinyloxyethoxy)ethyl (meth)acrylate is preferably used. Examples of the commercially available products of 2-(2-vinyloxyethoxy)ethyl (meth)acrylate include VEEA and VEEM manufactured by Nippon Shokubai Co., Ltd.

2-(2-Vinyloxyethoxy)ethyl (meth)acrylate is preferably contained within a range of 10% by mass to 100% by mass, and more preferably within a range of 15% by mass to 100% by mass, with respect to the total amount of the composition. In the case of less than 10% by mass, sufficient curing properties are not obtained, and therefore, back moving to the non-printed surface cannot be suppressed, the adhesion to a substrate of an ink coating film is decreased, or the odor generated from an ink coating film becomes strong.

(Polymerizable Compound Represented by General Formula (2))

In General Formula (2), each of $R_4$ and $R_5$ independently represents a hydrogen atom or a methyl group, each of $R_{6a}$, $R_{6b}$, and $R_{6c}$ independently represents a hydrogen atom, an alkyl group having 1 to 4 carbon atoms, or an alkoxy group having 1 to 4 carbon atoms, and m+n represents an integer of 0 to 4. The alkyl group having 1 to 4 carbon atoms of $R_{6a}$, $R_{6b}$, and $R_{6c}$, specifically, represents a methyl group, an ethyl group, a propyl group, or a butyl group. These may be linear or branched.

In addition, the alkoxy group having 1 to 4 carbon atoms of $R_{6a}$, $R_{6b}$, and $R_{6c}$, specifically, represents a methoxy group, an ethoxy group, a propoxy group, or a butoxy group. These may be linear or branched.

Among these, $R_{6a}$ and $R_{6c}$ are preferably hydrogen atoms, and $R_{6b}$ are preferably an alkyl group having 1 carbon atom, since the reactivity is good and the viscosity is low. In addition, m+n is preferably 4, and m and n are more preferably 2 and 2, respectively.

Among these, 3-methyl-1,5-pentanediol di(meth)acrylate is preferably used. Examples of the commercially available products of 3-methyl-1,5-pentanediol di(meth)acrylate include SR341 manufactured by Sartomer Co., Ltd., LIGHT ACRYLATE MPD-A manufactured by Kyoeisha Chemical Co., Ltd., and Photomer 4071F manufactured by IGM RESINS.

(Other Polymerizable Compounds)

In the present invention, there is no particular limitation except that 2-(2-vinyloxyethoxy)ethyl (meth)acrylate and 3-methyl-1,5-pentanediol di(meth)acrylate are used in combination, and known polymerizable compounds can be used in combination within a range not impairing the effect of the present invention.

Examples of the low molecular-weight monomer referred to as a polymerizable monomer among polymerizable compounds include (meth)acrylic acid alkyl esters such as methyl acrylate, ethyl acrylate, butyl acrylate, and 2-ethylhexyl acrylate; hydroxyalkyl (meth)acrylates such as 2-hydroxyethyl acrylate and 2-hydroxypropyl acrylate; alkoxyalkyl (meth)acrylates such as butoxyethyl acrylate and methoxybutyl (meth)acrylate; polyalkylene glycol (meth)acrylates such as polyethylene glycol mono(meth)acrylate, methoxy diethylene glycol (meth)acrylate, phenoxy polyethylene glycol (meth)acrylate, polypropylene glycol mono(meth)acrylate, methoxy polypropylene glycol (meth)acrylate, and nonylphenoxy polypropylene glycol (meth)acrylate; cycloalkyl (meth)acrylates such as cyclohexyl (meth)acrylate, dicyclopentadienyl (meth)acrylate, and isobornyl (meth)acrylate;

(meth)acrylates such as benzyl (meth)acrylate, 2-hydroxyethyl (meth)acryloyl phosphate, tetrahydrofurfuryl (meth)acrylate, diethylaminoethyl (meth)acrylate, and dimethylaminomethyl (meth)acrylate; (meth)acrylamides such as diacetone (meth)acrylamide and acryloylmorpholine; unsaturated carboxylic acid esters such as methyl crotonate, methyl cinnamate, dimethyl itaconate, dimethyl maleate, and dimethyl fumarate; unsaturated nitriles such as (meth)acrylonitrile, crotonic acid nitrile and maleic acid dinitrile; carboxylic acid vinyl esters such as vinyl acetate and vinyl propionate; alkyl vinyl ethers and cycloalkyl vinyl ethers such as ethyl vinyl ether, isobutyl vinyl ether, 2-ethylhexyl vinyl ether, and cyclohexyl vinyl ether; hydroxyl group-containing vinyl ethers such as 2-hydroxyethyl vinyl ether and 3-hydroxypropyl vinyl ether; hydroxyl group-containing allyl ethers such as 2-hydroxyethyl allyl ether and 4-hydroxybutyl allyl ether; and N-vinyl lactams and N-vinyl alkylamides such N-vinyl-2-pyrrolidone, N-vinyl caprolactam, and N-vinyl acetamide.

Examples of the multifunctional (meth)acrylate include alkylene glycol di(meth)acrylates such as ethylene glycol di(meth)acrylate, diethylene glycol di(meth)acrylate, triethylene glycol di(meth)acrylate, polyethylene glycol di(meth) acrylate, dipropylene glycol di(meth)acrylate, tripropylene glycol di(meth)acrylate, 1,3-butanediol di(meth)acrylate, 1,4-butanediol di(meth)acrylate, 1,6-hexanediol di(meth) acrylate, and neopentyl glycol di(meth)acrylate; poly(meth) acrylates of polyhydric alcohol such as trimethylolpropane di(meth)acrylate, trimethylolpropane tri(meth)acrylate, ditrimethylolpropane tetra(meth)acrylate, trimethylolpropane trihydroxyethyl tri(meth)acrylate, glycerine tri(meth)acrylate, pentaerythritol tetra(meth)acrylate, dipentaerythritol hexa(meth)acrylate, and hydroxypivalic acid neopentyl glycol di(meth)acrylate;

poly(meth)acrylates of isocyanurate such as isocyanurate tri(meth)acrylate, tris(2-hydroxyethyl)isocyanurate di(meth) acrylate, and tris(2-hydroxyethyl)isocyanurate tri(meth)acrylate; poly(meth)acrylates of cycloalkane such as tricyclodecanediyl dimethyl di(meth)acrylate; (meth)acrylate derivatives of bisphenol A such as di(meth)acrylate of ethylene oxide adduct of bisphenol A, di(meth)acrylate of propylene oxide adduct of bisphenol A, di(meth)acrylate of alkylene oxide adduct of bisphenol A, di(meth)acrylate of ethylene oxide adduct of hydrogenated bisphenol A, di(meth)acrylate of propylene oxide adduct of hydrogenated bisphenol A, di(meth)acrylate of alkylene oxide adduct of hydrogenated bisphenol A, and (meth)acrylate obtained from bisphenol A diglycidyl ether and (meth)acrylic acid; and divinyl ethers of alkylene glycol such as triethylene glycol divinyl ether. These can be used in combination of two or more types.

In applications in which a low viscosity is not desired, polymerizable oligomers such as a (meth)acrylate oligomer having a high molecular weight can also be used. Examples of the polymerizable oligomers include polyurethane (meth)acrylate, polyester (meth)acrylate, polyacrylic (meth)acrylate, epoxy (meth)acrylate, polyalkylene glycol poly(meth)acrylate, and polyether (meth)acrylates, and these can be used in combination of two or more types.

(Photopolymerization Initiator)

In the present invention, 2-(2-vinyloxyethoxy)ethyl (meth)acrylate, 3-methyl-1,5-pentanediol di(meth)acrylate, and a photopolymerization initiator are contained. As the photopolymerization initiator, which is not particularly limited, known photopolymerization initiators can be used, and among these, the photopolymerization initiator represented by General Formula (3) and/or the photopolymerization initiator represented by General Formula (4) are preferably used.

[Chem. 3]

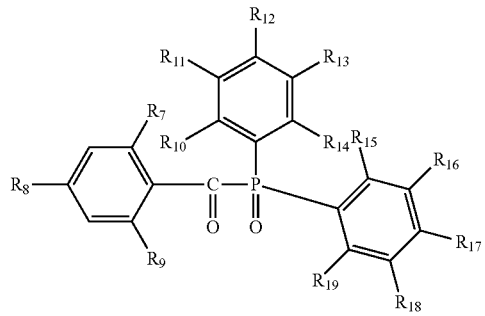

(3)

(In Formula (3), each of $R_7$ to $R_{19}$ independently represents hydrogen or an alkyl group having 1 to 12 carbon atoms, a cyclic aliphatic hydrocarbon group, a phenyl group, or an alkoxy group having 1 to 12 carbon atoms.)

[Chem. 4]

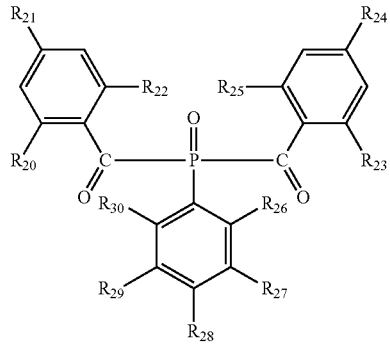

(4)

(In Formula (4), each of $R_{20}$ to $R_{30}$ independently represents hydrogen or an alkyl group having 1 to 12 carbon atoms, a cyclic aliphatic hydrocarbon group, a phenyl group, or an alkoxy group having 1 to 12 carbon atoms.)

More preferably, the photopolymerization initiator represented by General Formula (5) and/or the photopolymerization initiator represented by General Formula (7) are preferably used in combination.

[Chem. 5]

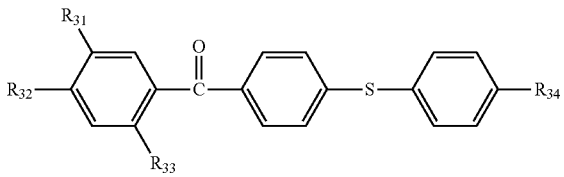

(5)

(In Formula (5), each of $R_{31}$, $R_{32}$, and $R_{33}$ independently represents a hydrogen atom, an alkyl group having 1 to 6 carbon atoms, an alkoxy group having 1 to 6 carbon atoms, a halogen atom, a cyano group, a phenyl group, a nitro group, —$SCH_3$, —O—CO—$R_{35}$, —CO—O—$R_{35}$, or —CO—$R_{35}$ (here, $R_{35}$ represents an alkyl group having 1 to 4 carbon atoms), and $R_{34}$ represents an alkyl group having 1 to 10 carbon atoms or a group represented by General Formula (6).)

[Chem. 6]

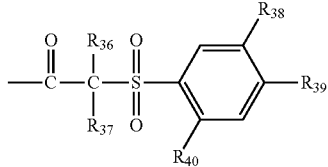

(6)

(In Formula (6), each of $R_{36}$, $R_{37}$, $R_{38}$, $R_{39}$, and $R_{40}$ independently represents a hydrogen atom, an alkyl group having 1 to 12 carbon atoms, an alkoxyl group having 1 to 6 carbon atoms, a halogen atom, a cyano group, a phenyl group, a nitro group, —$SCH_3$, —O—CO—$R_{41}$, —CO—O—$R_{41}$, or —CO—$R_{41}$ (here, $R_{41}$ represents an alkyl group having 1 to 4 carbon atoms).)

[Chem. 7]

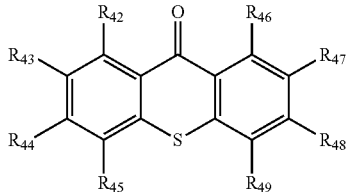

(7)

(In Formula (7), each of $R_{42}$ to $R_{49}$ independently represents a hydrogen atom, an alkyl group, a halogen atom, a hydroxy group, a cyano group, a nitro group, an amino group, an alkylthio group, an alkylamino group (which includes cases of being monosubstituted and disubstituted), an alkoxy group, an alkoxycarbonyl group, an acyloxy group, an acyl group, a carboxy group, or a sulfo group.)

In a case where the photopolymerization initiator represented by General Formula (3), and the photopolymerization initiator represented by General Formula (5) and/or photopolymerization initiator represented by General Formula (7) are used in combination, as the combination of the respective photopolymerization initiators, the photopolymerization initiator represented by General Formula (3) and the photopolymerization initiator represented by General Formula (5) may be combined, the photopolymerization initiator represented by General Formula (3) and the photopolymerization initiator represented by General Formula (7) may be combined, and the photopolymerization initiator represented by General Formula (3), the photopolymerization initiator represented by General Formula (5), and the photopolymerization initiator represented by General Formula (7) may be combined.

In addition, in a case where the photopolymerization initiator represented by General Formula (4), and the photopolymerization initiator represented by General Formula (5) and/or photopolymerization initiator represented by General Formula (7) are used in combination, as the combination of the respective photopolymerization initiators, the photopolymerization initiator represented by General Formula (4) and the photopolymerization initiator represented by General Formula (5) may be combined, the photopolymerization initiator represented by General Formula (4) and the photopolymerization initiator represented by General Formula (7) may be combined, and the photopolymerization initiator represented by General Formula (4), the photopolymerization initiator represented by General Formula (5), and the photopolymerization initiator represented by General Formula (7) may be combined.

(Photopolymerization Initiator Represented by General Formula (3))

In General Formula (3), each of $R_7$ to $R_{19}$ independently represents hydrogen, an alkyl group having 1 to 12 carbon atoms, a cyclic aliphatic hydrocarbon group, a phenyl group, or an alkoxy group having 1 to 12 carbon atoms.

The alkyl group having 1 to 12 carbon atoms of $R_7$ to $R_{19}$ in General Formula (3), specifically, represents a methyl group, an ethyl group, a propyl group, a butyl group, a pentyl group, a hexyl group, a heptyl group, an octyl group, a nonyl group, a decyl group, or a undecyl dodecyl group. These may be linear or branched.

The alkoxy group having 1 to 12 carbon atoms of $R_7$ to $R_{19}$ in General Formula (3), specifically, represents a methoxy group, an ethoxy group, a propoxy group, a butoxy group, a pentoxy group, a hexyloxy group, a heptoxy group, an octoxy group, a nonanoxy group, a decanoxy group, a undecanoxy group, and a dodecanoxy group. These may be linear or branched.

The photopolymerization initiator represented by General Formula (3) is preferably contained within a range of 2% to 15% by mass, and more preferably within a range of 2% to 10% by mass, with respect to the total solid content of the active energy ray-curable composition. In the case of less than 2% by mass, there is concern that the adhesion to a substrate of an ink coating film is decreased, and, on the other hand, in the case of greater than 10% by mass, there is a possibility that the photopolymerization initiator is precipitated at room temperature, the discharge port of an inkjet head is blocked, or the reactivity of the composition is decreased.

As the photopolymerization initiator represented by General Formula (3), specifically, 2,4,6-trimethylbenzoyl-diphenyl-phosphine oxide is exemplified.

In addition, examples of the commercially available products of the photopolymerization initiator represented by General Formula (3) include "Lucirin TPO" manufactured by BASF Corp.

(Photopolymerization Initiator Represented by General Formula (4))

In General Formula (4), each of $R_{20}$ to $R_{30}$ independently represents hydrogen or an alkyl group having 1 to 12 carbon atoms, a cyclic aliphatic hydrocarbon group, a phenyl group, or an alkoxy group having 1 to 12 carbon atoms.

The alkyl group having 1 to 12 carbon atoms of $R_{20}$ to $R_{30}$ in General Formula (4), specifically, represents a methyl group, an ethyl group, a propyl group, a butyl group, a pentyl group, a hexyl group, a heptyl group, an octyl group, a nonyl group, a decyl group, or a undecyl dodecyl group. These may be linear or branched.

The alkoxy group having 1 to 12 carbon atoms of $R_{20}$ to $R_{30}$ in General Formula (4), specifically, represents a methoxy group, an ethoxy group, a propoxy group, a butoxy group, a pentoxy group, a hexyloxy group, a heptoxy group, an octoxy group, a nonanoxy group, a decanoxy group, a undecanoxy group, and a dodecanoxy group. These may be linear or branched.

The photopolymerization initiator represented by General Formula (4) is preferably contained within a range of 2% to 10% by mass, and more preferably within a range of 2% to 5% by mass, with respect to the total solid content of the active energy ray-curable composition. In the case of less than 2% by mass, there is concern that the adhesion to a substrate of an ink coating film is decreased, and, on the other hand, in the case of greater than 5% by mass, there is a possibility that the photopolymerization initiator is precipitated at room temperature, the discharge port of an inkjet head is blocked, or the reactivity of the composition is decreased.

As the photopolymerization initiator represented by General Formula (4), specifically, bis(2,4,6-trimethylbenzoyl)-phenylphosphine oxide is exemplified.

In addition, examples of the commercially available products of the photopolymerization initiator represented by General Formula (4) include "Irgacure 819" manufactured by BASF Corp.

(Photopolymerization Initiator Represented by General Formula (5))

In Formula (5), each of $R_{31}$, $R_{32}$, and $R_{33}$ independently represents a hydrogen atom, an alkyl group having 1 to 6 carbon atoms, an alkoxyl group having 1 to 6 carbon atoms, a halogen atom, a cyano group, a phenyl group, a nitro group, —SCH$_3$, —O—CO—$R_{35}$, —CO—O—$R_{35}$, or —CO—$R_{35}$ (here, $R_{35}$ represents an alkyl group having 1 to 4 carbon atoms).

Specific examples of the alkyl group having 1 to 6 carbon atoms of $R_{31}$, $R_{32}$, and $R_{33}$ include a methyl group, an ethyl group, a propyl group, a butyl group, a pentyl group, and a hexyl group. These may be linear or branched.

Specific examples of the alkoxy group having 1 to 6 carbon atoms of $R_{31}$, $R_{32}$, and $R_{33}$ include a methoxy group, an ethoxy group, a propoxy group, a butyloxy group, a pentyloxy group, and a hexyloxy group. These may be linear or branched.

In addition, specific examples of the alkyl group having 1 to 4 carbon atoms of $R_{35}$ include a methyl group, an ethyl group, a propyl group, and a butyl group. These may be linear or branched.

Specific examples of the alkyl group having 1 to 10 carbon atoms of $R_{34}$ include a methyl group, an ethyl group, a propyl group, a butyl group, a pentyl group, a hexyl group, a heptyl group, an octyl group, a nonyl group, and a decyl group. These may be linear or branched.

In General Formula (6), each of $R_{36}$, $R_{37}$, $R_{38}$, $R_{39}$, and $R_{40}$ independently represents a hydrogen atom, an alkyl group having 1 to 6 carbon atoms, an alkoxyl group having 1 to 6 carbon atoms, a halogen atom, a cyano group, a phenyl group, a nitro group, —$SCH_3$, —$SCH_3$, —O—CO—$R_{41}$, —CO—O—$R_{41}$, or —CO—$R_{41}$ (here, $R_{41}$ represents an alkyl group having 1 to 4 carbon atoms).

The alkyl group having 1 to 12 carbon atoms of $R_{36}$, $R_{37}$, $R_{38}$, $R_{39}$, or $R_{40}$ represents a methyl group, an ethyl group, a propyl group, a butyl group, a pentyl group, a hexyl group, a heptyl group, an octyl group, a nonyl group, a decyl group, and a undecyl group. Specific examples of the alkoxy group having 1 to 6 carbon atoms include the same groups as $R_{31}$, $R_{32}$, and $R_{33}$.

In addition, the alkyl group having 1 to 4 carbon atoms of $R_{41}$, specifically, represents a methyl group, an ethyl group, a propyl group, and a butyl group. These may be linear or branched.

The photopolymerization initiator represented by General Formula (5) is preferably contained within a range of 0.5% to 7% by mass, and more preferably within a range of 0.5% to 5% by mass, with respect to the total solid content of the active energy ray-curable composition. In the case of less than 0.5% by mass, there is a possibility that sufficient curing performance is not obtained or odor of a cured coating film is increased, and, on the other hand, in the case of greater than 7% by mass, there is a possibility that the photopolymerization initiator is precipitated at room temperature, the discharge port of an inkjet head is blocked, or the reactivity of the composition is decreased.

Specific examples of the photopolymerization initiator represented by General Formula (5) include 4-benzoyl-4'-methyl diphenyl sulfide and 1-[4-(4-benzoylphenylsulfanyl)phenyl]-2-methyl-2-(4-methyl phenylsulfonyl)propan-1-one.

In addition, examples of the commercially available products of the photopolymerization initiator represented by General Formula (5) include "SB-PI 705" manufactured by SHUANG-BANG INDUSTRIAL CORPORATION, "KAYACURE BMS" manufactured by Nippon Kayaku Co., Ltd., and "ESACURE 1001M" manufactured by Lamberti S.p.A.

(Photopolymerization Initiator Represented by General Formula (7))

In Formula (7), each of $R_{42}$ to $R_{49}$ independently represents a hydrogen atom, an alkyl group, a halogen atom, a hydroxy group, a cyano group, a nitro group, an amino group, an alkylthio group, an alkylamino group (which includes cases of being monosubstituted and disubstituted), an alkoxy group, an alkoxycarbonyl group, an acyloxy group, an acyl group, a carboxy group, or a sulfo group.

The alkyl moiety in the alkyl group, the alkylthio group, the alkylamino group, the alkoxy group, the alkoxycarbonyl group, the acyloxy group, or the acyl group has preferably 1 to 20 carbon atoms, more preferably 1 to 8 carbon atoms, and still more preferably 1 to 4 carbon atoms.

Two adjacent groups of $R_{42}$ to $R_{49}$ may form a ring by linking with each other. In a case where these form a ring structure, as the ring structure, 5- or 6-membered ring aliphatic ring and aromatic ring are exemplified, and the ring structure may be a heterocycle including an element other than a carbon atom, and the formed rings may be further combined with each other to form a binuclear ring, for example, a condensed ring. These ring structure may further have a substituent. Examples of the substituent include a halogen atom, a hydroxy group, a cyano group, a nitro group, an acyloxy group, an acyl group, a carboxy group, and a sulfo group. In a case where the formed ring structure is a heterocycle, as the heteroatom, N, O, and S can be exemplified.

Examples of a thioxanthone compound include thioxanthone, 2-isopropylthioxanthone, 4-isopropylthioxanthone, 2-chlorothioxanthone, 2-dodecylthioxanthone, 2,4-diethylthioxanthone, 2,4-dimethylthioxanthone, 1-methoxycarbonyl thioxanthone, 2-ethoxycarbonyl thioxanthone, 3-(2-methoxyethoxycarbonyl)thioxanthone, 4-butoxycarbonyl thioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboximide, N-(1,1,3,3-tetramethylbutyl)thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N, N,N-trimethyl-1-propanaminium chloride.

Among these, 2,4-diethylthioxanthone, 2-isopropylthioxanthone, or 4-isopropylthioxanthone, which is relatively easily obtained, is preferable, and 2,4-diethylthioxanthone is more preferable. In addition, examples of the commercially available products of the photopolymerization initiator represented by General Formula (7) include "Chemcure JETX" manufactured by CHEMBRIDGE INTERNATIONAL Corp. and "SB-PI 799" manufactured by SHUANG-BANG INDUSTRIAL CORPORATION.

The photopolymerization initiator represented by General Formula (7) is preferably contained within a range of 0.5% by mass or greater and less than 10% by mass, and more preferably within a range of 0.5% by mass to 5% by mass, with respect to the total solid content of the active energy ray-curable composition. In the case of less than 0.5% by mass, there is a possibility that sufficient curing performance is not obtained or odor of a cured coating film is increased, and, on the other hand, in the case of greater than 5% by mass, the color of a cured coating film is largely changed to be yellowish, and thus, there is a possibility that the image quality significantly deteriorates.

(Other Photopolymerization Initiators)

As a photopolymerization initiator other than the compounds represented by General Formulas (3) to (7), a radical polymerization type photopolymerization initiator is preferably used. Specifically, benzoin isobutyl ether, benzyl, 2-benzyl-2-dimethylamino-1-(4-morpholinophenyl)-butan-1-one, 2-hydroxy-2-methyl-1-phenylpropan-1-one, and oligo(2-hydroxy-2-methyl-1-(4-(1-methylvinyl)phenyl)propan one) are suitably used, and as a molecular cleavage type photopolymerization initiator other than these, 1-hydroxycyclohexyl phenyl ketone, benzoinethyl ether, benzyldimethyl ketal, 1-(4-isopropylphenyl)-2-hydroxy-2-methylpropan-1-one, 2-methyl-1-(4-methylthiophenyl)-2-morpholinopropan-1-one, and the like may be used in combination, and benzophenone, 4-phenylbenzophenone, isophthalphenone, and the like, which are hydrogen abstraction photopolymerization initiators, can also be used in combination.

In particular, in the case of using an LED as a light source, a photopolymerization initiator is preferably selected in consideration of the emission peak wavelength of the LED. Examples of the photopolymerization initiator suitable for the case of using a UV-LED include bis(2,4,6-trimethylbenzoyl)-phenylphosphine oxide, 2,4,6-trimethylbenzoyl-diphenyl-phosphine oxide, 2-benzyl-2-dimethylamino-1-(4-morpholinophenyl)-butan-1-one, 2-(dimethylamino)-2-[(4-methylphenyl)methyl]-1-(4-morpholinophenyl)-butan-1-one), 2,4-diethylthioxanthone, and 2-isopropylthioxanthone.

As a sensitizer with respect to the photopolymerization initiator, amines which do not cause an addition reaction with the polymerization components described above, including low molecular-weight sensitizers such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone, or sensitizers obtained by increasing the molecular weights of the low molecular-weight sensitizers, can also be used in combination.

As the commercially available products thereof, for example, Speedcure 7040 manufactured by Lambson Limited, which is a polymer sensitizer having a molecular weight of 1000 or greater with a plurality of ethyl p-dimethylaminobenzoate units, or GENOPOL AB-1 manufactured by RAHN AG can be used.

These photopolymerization initiators or sensitizers are preferably suitably used within a range not impairing the effect of the present invention.

(Other Additives Polymerization Inhibitor)

To the active energy ray-curable composition of the present invention, other suitable additives can be added depending on the desired application. For example, in order to improve storage stability, a polymerization inhibitor such as hydroquinone, methoquinone, di-t-butyl hydroquinone, P-methoxyphenol, butyl hydroxytoluene, or a nitrosamine salt, or other phenol-based, phosphorus-based, or sulfur-based antioxidants may be added within a range of 0.01% to 2% by mass in an ink.

(Other Additives Colorant)

In addition, in the case of using the active energy ray-curable composition of the present invention as a painting material or an ink application, a colorant may be used. The colorant used may be any one of a dye and a pigment, and is preferably a pigment from the viewpoint of the durability of a printed matter. In addition, in the case of adding the colorant, as necessary, a dispersant known in the related art is preferably used.

Examples of the dye used in the present invention include various dyes which are used in normal inkjet recording, such as a direct dye, an acidic dye, a food dye, a basic dye, a reactive dye, a disperse dye, a vat dye, a soluble vat dye, a reactive and disperse dye.

As the pigment used in the present invention, an inorganic pigment or an organic pigment can be used. As the inorganic pigment, titanium oxide or iron oxide or carbon black produced by a known method such as a contact method, a furnace method, or a thermal method can be used.

In addition, as the organic pigment, azo pigments (including an azo lake, an insoluble azo pigment, a condensed azo pigment, and a chelate azo pigment), polycyclic pigments (for example, a phthalocyanine pigment, a perylene pigment, a perinone pigment, an anthraquinone pigment, a quinacridone pigment, a dioxazine pigment, a thioindigo pigment, an isoindolinone pigment, and a quinoflalone pigment), dye chelates (for example, a basic dye type chelate and an acidic dye type chelate), a nitro pigment, a nitroso pigment, or an aniline black can be used.

The average grain size of the pigment is suitably designed depending on the application. For example, in the case of applying the active energy ray-curable composition of the present invention to an ink for inkjet recording use, the average grain size of the pigment is preferably within a range of 10 nm to 200 nm, and more preferably within a range of about from 50 nm to 150 nm. In addition, the amount of the colorant added is preferably within a range of 1% by mass to 20% by mass of the total amount of the ink to obtain a sufficient image density or light resistance of a printed image.

(Other Additives)

In addition, within a range not impairing the effect of the present invention, a general-purpose organic solvent, a surfactant, a leveling additive, a matting agent, a polyester-based resin, a polyurethane-based resin, a vinyl-based resin, an acryl-based resin, or a rubber-based resin, as a film-forming resin, or waxes can be added.

The active energy ray-curable composition of the present invention is cured by irradiation with light such as active energy rays, and preferably with ultraviolet rays. Using a typical light source used for a UV curable inkjet ink, for example, a metal halide lamp, a xenon lamp, a carbon arc lamp, a chemical lamp, a low pressure mercury lamp, or a high pressure mercury lamp, as the light source of ultraviolet rays or the like, curing can be performed without any problem. Curing can be performed using commercially available products, for example, such as an H lamp, a D lamp, and a V lamp manufactured by Fusion System. In addition, curing is possible using a UV-LED or an ultraviolet ray emitting semiconductor element such as an ultraviolet ray emitting semiconductor laser since the sensitivity is good.

In the active energy ray-curable composition of the present invention, 2-(2-vinyloxyethoxy)ethyl (meth)acrylate is used as a polymerizable compound, and thus, adhesion to plastic is excellent.

Examples of plastic for food packaging include polyolefin films such as a polyethylene terephthalate (PET) film, a polystyrene film, a polyamide film, a polyacrylonitrile film, a polyethylene film (LLDPE: a low density polyethylene film, HDPE: a high density polyethylene film), or a polypropylene film (CPP: a unstretched polypropylene film, OPP: a biaxially stretched polypropylene film), a polyvinyl alcohol film, and ethylene-vinyl alcohol copolymer film. These may be subjected to a stretching treatment. As a stretching treatment method, it is general that after making a resin a sheet shape by melt-extruding by an extrusion film forming method, a simultaneous biaxial stretching or a sequential biaxial stretching is performed. In the case of the sequential biaxial stretching, it is general that first, a longitudinal stretching treatment is performed, and then, transverse stretching is performed. Specifically, a method of combining longitudinal stretching using a speed difference between the rolls and transverse stretching using a tenter is widely used.

When using the plastic for food packaging as a packaging material, a composite film formed of a laminate of the plastic is mainly used. Specifically, a composite film formed of two layers, for example, using a thermoplastic resin film selected from PET, OPP, and polyamide as the outermost layer and a thermoplastic resin film selected from an unstretched polypropylene film (hereinafter, abbreviated as CPP) and a low density polyethylene film (hereinafter, abbreviated as LLDPE) as the innermost layer, a composite film formed of three layers, for example, using a thermoplastic resin film which forms the outermost layer, selected from PET, polyamide, and OPP, a thermoplastic resin film which forms an intermediate layer, selected from OPP, PET, and polyamide, and a thermoplastic resin film which forms the innermost layer, selected from CPP and LLDPE, and a composite film formed of four layers, for example, using a thermoplastic resin film which forms the outermost layer, selected from OPP, PET, and polyamide, a thermoplastic film which forms a first intermediate layer, selected from PET and nylon, a thermoplastic film which forms a second intermediate layer, selected from PET and polyamide, and a thermoplastic resin film which forms the innermost layer, selected from LLDPE and CPP are preferably used as the food packaging material, and even in such a composite film, the active energy ray-curable composition of the present invention can be preferably used since the transparency is low.

The active energy ray-curable composition of the present invention can be prepared by a method in which a mixture of a pigment, a polymer dispersant, and a polymerizable compound is subjected to a treatment using a usual disperser such as a bead mill to disperse the pigment, a photopolymerization initiator and a surface tension adjuster are added thereto, and the obtained mixture is stirred and dissolved. The active energy ray-curable composition can also be prepared by a method in which a pigment dispersion (millbase) having a high concentration is produced by using a usual disperser such as a bead mill in advance, and a polymerizable compound in which a photopolymerization initiator has been dissolved and an additive are added thereto, and the mixture is stirred and mixed.

(Applications)

The active energy ray-curable composition of the present invention can be preferably used, for example, as an adhesive for laminate for food packaging, a coating painting material, a gravure ink for printing, or an ink for inkjet recording use.

In the case where applying the active energy ray-curable composition of the present invention as an ink for inkjet recording use, the viscosity depends on the inkjet apparatus to be used; however, the viscosity after mixing the polymerizable compound and the like is preferably designed to be about from 1 mPa·s to 100 mPa·s.

In a case where an active energy ray-curable type ink composition for inkjet recording use contains a colorant, the ink composition containing the colorant may be provided in each color. For example, in the case of adding a dark or a light color of the same series for each color in addition to the basic four colors of yellow, magenta, cyan, and black, light magenta which is a light color and red which is a dark color in addition to magenta, light cyan which is a light color and blue which is a dark color in addition to cyan, and gray or light black which is a light color and matte black which is a dark color in addition to black are exemplified.

In addition, within a range not impairing the discharge stability, a surfactant, a leveling additive, a matting agent, a polyester-based resin, a polyurethane-based resin, a vinyl-based resin, an acryl-based resin, a rubber-based resin, or waxes, for adjusting the film physical properties, can be added, as necessary.

In the case of using a pigment, a pigment dispersant is preferably used for the purpose of improving the dispersion stability with respect to the active energy ray-polymerizable compound. Specifically, Ajisper PB821, PB822, and PB817 manufactured by Ajinomoto Fine-Techno Co., Inc., Solsperse 24000GR, 32000, 33000, and 39000 manufactured by Avecia, DISPARLON DA-703-50, DA-705, and DA-725 manufactured by Kusumoto Chemicals, Ltd. are exemplified; however, the present invention is not limited thereto. The amount of the pigment dispersant used is preferably within a range of 10% to 80% by mass, and particularly preferably within a range of 20% to 60% by mass, with respect to the pigment. In a case where the amount used is less than 10% by mass, there is a tendency that the dispersion stability is insufficient, and in a case where the amount used is greater than 80% by mass, there is a tendency that the viscosity of an ink is increased and the discharge stability is easily decreased.

In addition, for the purpose of imparting adhesion to a substrate to be printed, a non-reactive resin such as an acrylic resin, an epoxy resin, a terpenephenol resin, or a rosin ester, and the like can be mixed within a range not impairing the effect of the present invention.

The active energy ray-curable type ink composition for inkjet recording use can be prepared by a method in which, in the case of including a pigment, a mixture of a pigment, an active energy ray-polymerizable compound, and as necessary, a pigment dispersant, and a resin is subjected to a treatment using a usual disperser such as a bead mill to disperse the pigment, a photopolymerization initiator is added thereto, and as necessary, an additive such as a surface tension adjuster is added thereto, and then, the mixture is stirred and dissolved. The active energy ray-curable type ink composition for inkjet recording use can also be prepared by a method in which a pigment dispersion (millbase) having a high concentration is produced by using a usual disperser such as a bead mill in advance, and an active energy ray-polymerizable compound in which a photopolymerization initiator has been dissolved and an additive are added thereto, and the mixture is stirred and mixed.

As the stirring and dispersing apparatus for dispersing a pigment, in addition to the bead mill, known various dispersers known in the related art, for example, such as an ultrasonic homogenizer, a high pressure homogenizer, a paint shaker, a ball mill, a roll mill, a sand mill, a sand grinder, a dyno mill, a dispermat, a SC mill, and a nanomizer can be used.

EXAMPLES

Hereinafter, the invention will be described in more detail by using examples; however, the present invention is not limited to the following examples. Incidentally, g and % in the following examples are in terms of mass.

The materials used when preparing ink compositions of Examples and Comparative Examples are as shown below.

[Pigment]

FASTGEN BLUE TGR-G (Pigment Blue 15:4, manufactured by DIC Corporation) [Dispersant]

SOLSPERSE 32000 (polymer dispersant, manufactured by Lubrizol Corp.)

[Polymerizable Compound]

VEEA (2-(2-vinyloxyethoxy)ethyl acrylate, manufactured by Nippon Shokubai Co., Ltd.)

SR341 (3-methyl-1,5-pentanediol diacrylate), manufactured by Sartomer Co., Ltd.

DPGDA (dipropylene glycol diacrylate, manufactured by Daicel-Cytec Inc.)

LIGHT ACRYLATE POA (phenoxyethyl acrylate, manufactured by Kyoeisha Chemical Co., Ltd.)

ARONIX M-220 (tripropylene glycol diacrylate, manufactured by Toagosei Co., Ltd.)

SR238 (1,6-hexanediol diacrylate, manufactured by Sartomer Co., Ltd.)

A-NOD-N (1,9-nonanediol diacrylate, manufactured by Shin-Nakamura Chemical Co., Ltd.)

A-DOD-N (1,10-decanediol diacrylate, manufactured by Shin-Nakamura Chemical Co., Ltd.)

SR268 (tetraethylene glycol diacrylate, manufactured by Sartomer Co., Ltd.)

A-200 (polyethylene glycol (200) diacrylate, manufactured by Shin-Nakamura Chemical Co., Ltd.)

A-400 (polyethylene glycol (400) diacrylate, manufactured by Shin-Nakamura Chemical Co., Ltd.)

A-600 (polyethylene glycol (600) diacrylate, manufactured by Shin-Nakamura Chemical Co., Ltd.)

SR9003 (propoxylated neopentyl glycol diacrylate, manufactured by Sartomer Co., Ltd.)

| [Photopolymerization Initiator] | |
|---|---|
| Lucirin (2,4,6-trimethylbenzoyl-diphenyl-phosphineoxide, manufactured by BASF Corp.) | TPO |
| Irgacure (bis(2,4,6-trimethylbenzoyl)-phenylphosphineoxide, manufactured by BASF Corp.) | 819 |
| Irgacure (2-methyl-1-(4-methylthiophenyl)-2-morpholinopropan-1-one, manufactured by BASF Corp.) 2-methyl-1-(4-methylthiophenyl)-2-morpholinopro | 907 |
| Irgacure (2-benzyl-2-dimethylamino-1-(4-morpholinophenyl)-butanone-1, manufactured by BASF Corp.) | 369 |
| Esacure (1-[4-(4-benzoylphenylsulfanyl)phenyl]-2-methyl-2-(4-methyl-phenylsulfonyl)propan-1-one, manufactured by Lamberti S.p.A.) | 1001M |

Chemcure JETX (2,4-diethylthioxanthone, manufactured by CHEMBRIGE INTERNATIONAL Corp.)

SB-PI 712 (4-methyl benzophenone, manufactured by SHUANG-BANG INDUSTRIAL CORPORATION)

SB-PI 704 (ethyl-4-dimethylaminobenzoate, manufactured by SHUANG-BANG INDUSTRIAL CORPORATION)

[Polymerization Inhibitor]
Methoquinone (manufactured by Seiko Chemical Co., Ltd.)

[Silicone Polyether Acrylate]
TEGO RAD 2300 (manufactured by Evonik Industries)

[Preparation of High Concentration Cyan Dispersion]

After 10 parts of FASTGEN BLUE TGR-G (Pigment Blue 15:4, manufactured by DIC Corporation), 6 parts of a polymer dispersant "SOLSPERSE 32000", 84 parts of dipropylene glycol diacrylate were stirred and mixed with a stirrer for 1 hour, the resultant product was subjected to a bead mill treatment for 4 hours, whereby a high concentration cyan dispersion body was produced.

[Preparation of Active Energy Ray-Curable Composition of Examples and Comparative Examples]

Additives and photopolymerization initiators were added to each of the polymerizable compounds in Tables 1 and 2, and the mixture was stirred at room temperature for 10 minutes. The abbreviations in Tables are as described above. The liquid after stirring was put in a thermostat at 60° C., and left to stand for 20 minutes to completely dissolve the photoinitiator. The heated solution was taken out from the thermostat, and the liquid was cooled to room temperature while stirring. After the temperature of the liquid became room temperature, each color high concentration dispersion described above was added thereto, and the mixture was stirred for 10 minutes. The produced liquid was filtered using a membrane filter having a pore size of 1.2 μm, whereby an active energy ray-curable composition was produced.

[Production of Thin Film Coating Product]

Each of active energy ray-curable compositions having the composition ratios described in Tables 1 and 2 was applied to a white PET seal (PET50 K2411, manufactured by Lintec Corporation, length×width: 15 cm×3.5 cm) using a bar coater No. 3. Next, ultraviolet rays were applied to the composition using a UV irradiation apparatus manufactured by a GS Yuasa Corporation (4 kW (160 W)×1 light (metal halide lamp, lamp output of 80 W/cm, conveyor speed of 22 m/min, accumulated amount of light per path of 35 mJ/cm$^2$). After the application, the following evaluations were performed by using the obtained cured product. The average film thickness of the cured product completely cured was 3 μm.

[Production of Thick Film Coating Product]

Each of active energy ray-curable compositions having the composition ratios described in Tables 1 and 2 was applied to a white PET seal (PET50 K2411, manufactured by Lintec Corporation, length×width: 15 cm×3.5 cm) using a bar coater No. 7. Next, ultraviolet rays were applied to the composition using a UV irradiation apparatus manufactured by a GS Yuasa Corporation (4 kW (160 W)×1 light (metal halide lamp, lamp output of 80 W/cm, conveyor speed of 22 m/min, accumulated amount of light per path of 35 mJ/cm$^2$). After the application, the following evaluations were performed by using the obtained cured product. The average film thickness of the cured product completely cured was 8 μm.

[Evaluation of Curing Properties]

Evaluation of the curing properties was performed as follows.

5: When the accumulated amount of light applied to the coating film was 70 mJ/cm$^2$ or less, tackiness of the cured coating film surface completely disappeared and damage of the coating film was not observed even in a case where the coating film was rubbed with a finger.

4: When the accumulated amount of light applied to the coating film was greater than 70 mJ/cm$^2$ and 140 mJ/cm$^2$ or less, tackiness of the cured coating film surface completely disappeared and damage of the coating film was not observed even in a case where the coating film was rubbed with a finger.

3: When the accumulated amount of light applied to the coating film was greater than 140 mJ/cm$^2$ and 210 mJ/cm$^2$ or less, tackiness of the cured coating film surface completely disappeared and damage of the coating film was not observed even in a case where the coating film was rubbed with a finger.

2: When the accumulated amount of light applied to the coating film was greater than 210 mJ/cm$^2$ and 490 mJ/cm$^2$ or less, tackiness of the cured coating film surface completely disappeared and damage of the coating film was not observed even in a case where the coating film was rubbed with a finger.

1: When the accumulated amount of light applied to the coating film was greater than 490 mJ/cm², tackiness of the cured coating film surface completely disappeared and damage of the coating film was not observed even in a case where the coating film was rubbed with a finger.

[Evaluation of Odor of Cured Coating Film]

The thin film cured product and the cured coating film produced above were put into a glass bottle, and the bottle was sealed. After heating at 60° C. for 1 hour in an oven, the vessel was left to stand at room temperature for 1 hour, and by a sensory analysis immediately after opening the lid, the evaluation was performed on a scale of five stages. The larger number means less odor.

The results are shown in Tables 1 and 2.

TABLE 1

|  | Example 1 | Example 2 | Example 3 | Example 4 | Example 5 | Example 6 |
|---|---|---|---|---|---|---|
| FASTGEN BLUE TGR-G | 1.8 | 1.8 | 1.8 | 1.8 | 1.8 | 1.8 |
| Solsperse 32000 | 1.1 | 1.1 | 1.1 | 1.1 | 1.1 | 1.1 |
| POA | 15.1 | 15.1 | 15.1 | 15.1 | 15.1 | 15.1 |
| Total of high concentration dispersion body | 18 | 18 | 18 | 18 | 18 | 18 |
| VEEA | 35 | 35 | 35 | 35 | 35 | 35 |
| SR341 | 36.7 | 38.7 | 36.7 | 36.7 | 36.7 | 36.7 |
| Irgacure 819 | 4 | 4 |  |  |  | 4 |
| Lucirin TPO | 3 | 3 | 7 | 7 |  | 3 |
| Irgacure 907 |  |  |  |  | 4 |  |
| Irgacure 369 |  |  |  |  | 3 |  |
| ESACURE 1001M | 2 |  | 2 |  | 2 |  |
| Chemcure JETX |  | 2 |  | 2 |  |  |
| SB-PI 712 |  |  |  |  |  | 2 |
| SB-PI 704 | 1 | 1 | 1 | 1 | 1 | 1 |
| TEGORAD 2300 | 0.2 | 0.2 | 0.2 | 0.2 | 0.2 | 0.2 |
| Methoquinone | 0.1 | 0.1 | 0.1 | 0.1 | 0.1 | 0.1 |
| Total | 100 | 100 | 100 | 100 | 100 | 100 |
| Curing properties thin film (3 μm) | 5 | 5 | 5 | 5 | 5 | 5 |
| Curing properties thick film (8 μm) | 5 | 5 | 5 | 5 | 4 | 4 |
| Coating film odor thin film (3 μm) | 5 | 5 | 5 | 5 | 3 | 5 |
| Coating film odor thick film (3 μm) | 5 | 5 | 5 | 5 | 2 | 5 |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| FASTGEN BLUE TGR-G | 1.8 | 1.8 | 1.8 | 1.8 | 1.8 | 1.8 | 1.8 | 1.8 | 1.8 | 1.8 |
| Solsperse 32000 | 1.1 | 1.1 | 1.1 | 1.1 | 1.1 | 1.1 | 1.1 | 1.1 | 1.1 | 1.1 |
| POA | 15.1 | 15.1 | 15.1 | 15.1 | 15.1 | 15.1 | 15.1 | 15.1 | 15.1 | 15.1 |
| Total of high concentration dispersion body | 18 | 18 | 18 | 18 | 18 | 18 | 18 | 18 | 18 | 18 |
| VEEA | 35 | 35 | 35 | 35 | 35 | 35 | 35 | 35 | 35 | 35 |
| SR341 |  |  |  |  |  |  |  |  |  |  |
| DPGDA | 36.7 |  |  |  |  |  |  |  |  |  |
| ARONIX M-220 |  | 36.7 |  |  |  |  |  |  |  |  |
| SR238 |  |  | 36.7 |  |  |  |  |  |  |  |
| A-NOD-N |  |  |  | 36.7 |  |  |  |  |  |  |
| A-DOD-N |  |  |  |  | 36.7 |  |  |  |  |  |
| SR268 |  |  |  |  |  | 36.7 |  |  |  |  |
| A-200 |  |  |  |  |  |  | 36.7 |  |  |  |
| A-400 |  |  |  |  |  |  |  | 36.7 |  |  |
| A-600 |  |  |  |  |  |  |  |  | 36.7 |  |
| SR9003 |  |  |  |  |  |  |  |  |  | 36.7 |
| Irgacure 819 | 4 | 4 | 4 | 4 | 4 | 4 | 4 | 4 | 4 | 4 |
| Lucirin TPO | 3 | 3 | 3 | 3 | 3 | 3 | 3 | 3 | 3 | 3 |
| Irgacure 907 |  |  |  |  |  |  |  |  |  |  |
| Irgacure 369 |  |  |  |  |  |  |  |  |  |  |

TABLE 2-continued

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| ESACURE 1001M Chemcure JETX SB-PI 712 | 2 | 2 | 2 | 2 | 2 | 2 | 2 | 2 | 2 | 2 |
| SB-PI 704 | 1 | 1 | 1 | 1 | 1 | 1 | 1 | 1 | 1 | 1 |
| TEGORAD 2300 | 0.2 | 0.2 | 0.2 | 0.2 | 0.2 | 0.2 | 0.2 | 0.2 | 0.2 | 0.2 |
| Methoquinone | 0.1 | 0.1 | 0.1 | 0.1 | 0.1 | 0.1 | 0.1 | 0.1 | 0.1 | 0.1 |
| Total | 100 | 100 | 100 | 100 | 100 | 100 | 100 | 100 | 100 | 100 |
| Curing properties thin film (3 μm) | 4 | 3 | 3 | 2 | 2 | 2 | 2 | 2 | 2 | 3 |
| Curing properties thick film (8 μm) | 4 | 3 | 3 | 2 | 2 | 2 | 2 | 2 | 2 | 3 |
| Coating film odor thin film (3 μm) | 2 | 2 | 3 | 3 | 3 | 4 | 4 | 4 | 4 | 4 |
| Coating film odor thick film (3 μm) | 2 | 2 | 3 | 3 | 3 | 4 | 4 | 4 | 4 | 4 |

As a result, the evaluation results of all of Examples 1 to 4 were good. Example 5 was an example in which an aminoacetophenone-based photopolymerization initiator was used without using an acylphosphine oxide-based photopolymerization initiator as a photopolymerization initiator, and a result in which in Example 5, the thick film curing properties were slightly lower compared to those in Examples 1 to 4 was obtained. In Example 5, odor was slightly greater compared to those in Examples 1 to 4. On the other hand, Example 6 was an example in which, instead of the photopolymerization initiator of General Formula (5) or the photopolymerization initiator of General Formula (7), which is a hydrogen abstraction photopolymerization initiator, a 4-methyl benzophenone which is also a hydrogen abstraction initiator was used. A result in which the thick film curing properties were slightly lower compared to those in Examples 1 to 4 was obtained, in the same manner as in Example 5.

On the other hand, Comparative Examples 1 to 10 were examples in which a difunctional acrylate monomer other than the polymerizable compound represented by General Formula (2) was used as a polymerizable compound. A result in which, in any of Comparative Examples, compared to the composition ratio of Example, curing properties of a thin film or a thick film, and odor generated from a coating film were inferior compared to the composition ratios of Examples was obtained.

From the above, by combining the polymerizable compound represented by General Formula (1) and the polymerizable compound represented by General Formula (2), the curing properties of an ink were further increased, and the odor of the cured coating film was also suitably reduced. It is considered that the combination of the polymerizable compound represented by General Formula (1) and the polymerizable compound represented by General Formula (2) can suitably reduce the residual monomer in the cured coating film compared to the combination of the polymerizable compound represented by General Formula (1) and a difunctional monomer other than the polymerizable compound represented by General Formula (2) exemplified in Comparative Examples, and can suppress the odor generated from the cured coating film compared to the combinations with other monomers.

On the other hand, it is considered that, by combining one photopolymerization initiator of General Formulas (3) to (7) and the polymerizable compounds of General Formulas (1) and (2), the curing properties of an ink are further improved, and radicals generated from the photopolymerization initiator can be suitably supplemented in the coating film, compared to combinations with other photopolymerization initiators. Therefore, it is considered that the specific odor derived from the decomposition products of the photopolymerization initiator can also be reduced.

From the above results, it is confirmed that, by satisfying the constitution of the present invention, an active energy ray-curable composition of which the curing properties are good regardless of the film thickness and the printing ratio of a printed matter and in which the odor generated from the coating film is significantly low can be obtained.

INDUSTRIAL APPLICABILITY

The active energy ray-curable composition of the present invention can be naturally used as a composition for an inkjet ink having a low viscosity, and can be used in various fields, for example, in wood coating materials, various building materials, high gloss printed matters, glossy paper, photographic paper, base coat, plastic hard coat, or optical fiber coating, in the field of painting, various plastic products, lithographic inks of bills, gravure inks, flexographic inks, screen inks, or inkjet inks, and in the field of printing, various laminates, adhesive films, or optical recording disks, as adhesive applications. The active energy ray-curable composition of the present invention can be used in printed circuit boards, magnetic tapes, magnetic disks, semiconductor sealing materials, adhesives for liquid crystal cell, in the field of electronics, and can be used in molding of a three-dimensional model as light molding. In addition, since vinyl ether group-containing (meth)acrylic acid ester which is less likely to be influenced by oxygen, and is excellent in curing properties and in adhesion to a substrate having a low adhesion such as plastic is used in the active energy ray-curable composition of the present invention, the active energy ray-curable composition can be preferably used as various compositions for food packaging, for example, an adhesive for laminate for food packaging, a coating painting material, as a gravure ink for printing or an ink for inkjet recording use.

The invention claimed is:
1. An active energy ray-curable composition, comprising:
a polymerizable compound which is 2-(2-vinyloxyethoxy)ethyl (meth)acrylate;

a polymerizable compound which is 3-methyl-1,5-pentanediol di(meth)acrylate; and a photopolymerization initiator which is 2,4,6-trimethyl benzoyl-diphenyl-phosphineoxide.

2. The active energy ray-curable composition according to claim 1, further comprising:

a photopolymerization initiator represented by General Formula (4),

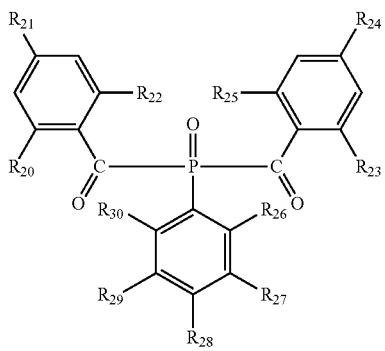

(4)

wherein each of $R_{20}$ to $R_{30}$ independently represents hydrogen or an alkyl group having 1 to 12 carbon atoms, a cyclic aliphatic hydrocarbon group, a phenyl group, or an alkoxy group having 1 to 12 carbon atoms.

3. The active energy ray-curable composition according to claim 2, further comprising:

a photopolymerization initiator represented by General Formula (5); and/or a photopolymerization initiator represented by General Formula (7),

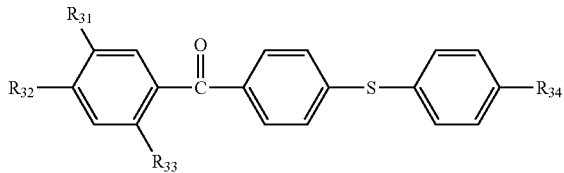

(5)

wherein each of $R_{31}$, $R_{32}$, and $R_{33}$ independently represents a hydrogen atom, an alkyl group having 1 to 6 carbon atoms, an alkoxy group having 1 to 6 carbon atoms, a halogen atom, a cyano group, a phenyl group, a nitro group, —$SCH_3$, —O—CO—$R_{35}$, —CO—O—$R_{35}$, or —CO—$R_{35}$ (wherein $R_{35}$ represents an alkyl group having 1 to 4 carbon atoms), and $R_{34}$ represents an alkyl group having 1 to 10 carbon atoms or a group represented by General Formula (6),

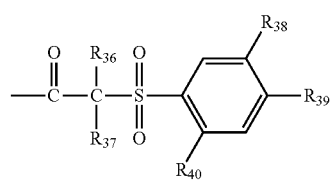

(6)

wherein each of $R_{36}$, $R_{37}$, $R_{38}$, $R_{39}$, and $R_{40}$ independently represents a hydrogen atom, an alkyl group having 1 to 12 carbon atoms, an alkoxyl group having 1 to 6 carbon atoms, a halogen atom, a cyano group, a phenyl group, a nitro group, —$SCH_3$, —O—CO—$R_{41}$, —CO—O—$R_{41}$, or —CO—$R_{41}$ (wherein $R_{41}$ represents an alkyl group having 1 to 4 carbon atoms), and

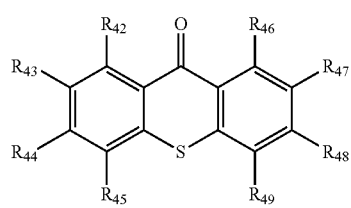

(7)

wherein each of $R_{42}$ to $R_{49}$ independently represents a hydrogen atom, an alkyl group, a halogen atom, a hydroxy group, a cyano group, a nitro group, an amino group, an alkylthio group, an alkylamino group (which includes cases of being monosubstituted and disubstituted), an alkoxy group, an alkoxycarbonyl group, an acyloxy group, an acyl group, a carboxy group, or a sulfo group.

4. A cured product formed by curing the active energy ray-curable composition according to claim 1.

5. An ink composition for inkjet recording use, wherein the active energy ray-curable composition according to claim 1 is used.

* * * * *